(12) United States Patent
Tamagawa et al.

(10) Patent No.: US 6,330,498 B2
(45) Date of Patent: *Dec. 11, 2001

(54) CONTROL SYSTEM FOR HYBRID VEHICLE

(75) Inventors: Yutaka Tamagawa; Motoshi Ishikawa; Toru Yano; Yoshikazu Oshima, all of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,912

(22) Filed: Nov. 24, 1998

(30) Foreign Application Priority Data

Nov. 28, 1997 (JP) .................................................. 9-344304

(51) Int. Cl.⁷ .............................. B60L 11/00; G05D 1/00; G06F 19/00
(52) U.S. Cl. ................................ 701/22; 701/54; 701/110; 180/65.2; 180/65.8
(58) Field of Search ............................... 701/22, 54, 110; 180/65.2, 65.4, 65.8

(56) References Cited

U.S. PATENT DOCUMENTS

| | | | |
|---|---|---|---|
| 5,495,906 | * 3/1996 | Furutani | 180/65.2 |
| 5,656,921 | 8/1997 | Farrall | 322/40 |
| 5,664,635 | 9/1997 | Koga et al. | 180/65.3 |
| 5,713,426 | * 2/1998 | Okamura | 180/65.3 |
| 5,862,497 | * 1/1999 | Yano et al. | 701/22 |
| 5,984,033 | * 11/1999 | Tamagawa et al. | 180/65.2 |
| 6,090,007 | * 7/2000 | Nakajima et al. | 477/46 |

FOREIGN PATENT DOCUMENTS

| 0 724 979 A1 | 8/1996 | (EP) . |
|---|---|---|
| 195 05 431 A1 | 8/1996 | (DE) . |
| 3-121928 | 5/1991 | (JP) . |

* cited by examiner

*Primary Examiner*—Jacques H. Louis-Jacques
*Assistant Examiner*—Brian J Broadhead
(74) *Attorney, Agent, or Firm*—Arent Fox Kintner Plotkin & Kahn, PLLC

(57) ABSTRACT

A control system controls a hybrid vehicle having an engine for rotating a drive axle, an electric motor for assisting the engine in rotating the drive axle, and electric energy storage means for supplying electric energy to the electric motor. The control system has an electric motor control unit which calculates an output power of the electric motor depending on an operating status of the hybrid vehicle and assists the engine based on the calculated output power of the electric motor. The electric motor control unit also reduces the output power of the electric motor when the rotational speed of the engine or the speed of the hybrid vehicle exceeds a predetermined value.

11 Claims, 15 Drawing Sheets

FIG. 10

| θthcom (DEGREES) ↓ | NE (rpm) → | | | | |
|---|---|---|---|---|---|
|  | 0 | 500 |  | 9500 | 10000 |
| 0 |  |  |  |  |  |
| 1 |  |  |  |  |  |
| ⋮ |  |  | DEMAND DRIVE POWER POWERcom (KW) |  |  |
| 89 |  |  |  |  |  |
| 90 |  |  |  |  |  |

FIG. 11

| EXTRA OUTPUT POWER (Kw) ↓ | VEHICLE SPEED (Km/h) → | | | | |
|---|---|---|---|---|---|
|  | 0 | 10 |  | 160 | 170 |
| 0 |  |  |  |  |  |
| 1 |  |  |  |  |  |
| ⋮ |  |  | RUNNING STATUS QUANTITY VSTATUS (%) |  |  |
| 99 |  |  |  |  |  |
| 100 |  |  |  |  |  |

# CONTROL SYSTEM FOR HYBRID VEHICLE

BACKGROUND OF THE INVENTION

1. Field of the Invention

The present invention relates to a control system for controlling a hybrid vehicle having an internal combustion engine and an electric motor as separate propulsion sources.

2. Description of the Related Art

There have heretofore been known hybrid vehicles each having an internal combustion engine and an electric motor as separate propulsion sources. One known control system for controlling the propulsion sources of such a hybrid vehicle is a control system mounted on a large-size bus as disclosed in Japanese laid-open patent publication No. 3-121928.

The disclosed control system, which controls a hybrid vehicle having a diesel engine and an electric motor, determines an assistive power to be generated by the electric motor based on the rotational speed NE of the diesel engine and the position of a control rack of a fuel supply pump. The control system controls the electric motor to generate an assistive power for the diesel engine when the diesel engine is subject to a high load range higher than a predetermined level. The diesel engine is thus operated only in a load range smaller than a full load range for the purpose of improving engine exhaust gases containing nitrogen oxides and black smoke. The control system primarily controls the electric motor to generate an assistive power when the large-size bus starts to move, posing a high load on the diesel engine. However, it is preferable for the electric motor to generate an assistive power depending on the propulsive force that is needed by the hybrid vehicle even when the hybrid vehicle is normally accelerated. Since the conventional control system does not pay much attention to the generation of an assistive power from the electric motor when the hybrid vehicle is further accelerated while the diesel engine is rotating at a high speed or the hybrid vehicle is running at a high speed, the conventional control system suffers drawbacks as described below.

When the hybrid vehicle is to be accelerated while it is running at a high speed, the driver tends to press the accelerator pedal deeply though it does not intend to accelerate the hybrid vehicle so rapidly. Therefore, the control system may control the electric motor to generate an assistive power even if such an assistive power generated by the electric motor is not in fact required. When this happens, a certain amount of stored electric energy is wasted by the electric motor, and it may be too large to energize the electric motor to generate a sufficient assistive power that may be necessary next time to accelerate the hybrid vehicle from a low speed. When the hybrid vehicle is running at a high speed or the diesel engine is rotating at a high speed, since the resistance to the running of the hybrid vehicle (running resistance) and the counterelectromotive force of the electric motor are large, a large amount of stored electric energy is needed to energize the electric motor to generate an assistive power.

SUMMARY OF THE INVENTION

It is therefore an object of the present invention to provide a control system for controlling the electric motor on a hybrid vehicle to generate an assistive power depending on a manipulated variable from a drive power control means for the hybrid vehicle such that the assistive power generated by the electric motor is reduced when the hybrid vehicle is running at a high speed, for thereby saving electric energy stored for energizing the electric motor, and the electric motor generates a sufficient assistive power when the engine is to be effectively assisted thereby as when the hybrid vehicle is running at a low speed.

Another object of the present invention is to provide a control system for reducing the output power of an electric motor on a hybrid vehicle when the rotational speed of the engine on the hybrid vehicle or the speed of the hybrid vehicle exceeds a predetermined level.

Still another object of the present invention is to provide a control system for reducing the output power of the electric motor on a hybrid vehicle when a detected manipulated variable from a drive power control means for controlling the drive power of the hybrid vehicle is lower than a reference level established on the basis of the rotational speed of an engine on the hybrid vehicle or the speed of the hybrid vehicle.

Yet another object of the present invention is to provide a control system for increasing the output power of the engine on a hybrid vehicle in synchronism with a reduction in the output power of the electric motor on the hybrid vehicle when the engine is rotating in a high speed range or the hybrid vehicle is running in a high speed range.

According to the present invention, there is provided a control system for controlling a hybrid vehicle having an engine for rotating a drive axle, an electric motor for assisting the engine in rotating the drive axle, and electric energy storage means for supplying electric energy to the electric motor, comprising drive assistance control means for calculating an output power of the electric motor depending on an operating status of the hybrid vehicle and assisting the engine based on the calculated output power of the electric motor, and detecting means for detecting a rotational speed of the engine or a speed of the hybrid vehicle, the drive assistance control means comprising means for reducing the output power of the electric motor when the detected rotational speed of the engine or the detected speed of the hybrid vehicle exceeds a predetermined value.

With the above arrangement, when the detected rotational speed of the engine or the detected speed of the hybrid vehicle exceeds the predetermined value, the output power of the electric motor is reduced, and hence the assistive power generated by the electric motor is reduced. Therefore, the electric energy stored for energizing the electric motor is saved when the engine outputs a high power as when the speed of the hybrid vehicle or the rotational speed of the engine is high. The electric motor is controlled to generate a sufficient assistive power when the engine is to be effectively assisted thereby as when the hybrid vehicle is running at a low speed.

According to the present invention, there is also provided a control system for controlling a hybrid vehicle having an engine for rotating a drive axle, an electric motor for assisting the engine in rotating the drive axle, electric energy storage means for supplying electric energy to the electric motor, and drive power control means for controlling a demand drive power of the hybrid vehicle, comprising drive assistance control means for calculating an output power of the electric motor depending on the demand drive power of the hybrid vehicle and assisting the engine based on the calculated output power of the electric motor, and manipulated variable detecting means for detecting a manipulated variable from the drive power control means, the drive assistance control means comprising means for reducing the output power of the electric motor when the detected manipulated variable from the drive power control means is smaller than a predetermined reference value.

With the above arrangement, when the detected manipulated variable from the drive power control means is smaller than the predetermined reference value, the output power of the electric motor is reduced. The assistive power generated by the electric motor is reduced, thus saving electric energy stored for energizing the electric motor, when there is no or little need to assist the engine. If the reference value is established so as to increase as the rotational speed of the engine or the speed of the hybrid vehicle increases, then since it is more likely for the output power of the electric motor to be reduced when the engine outputs a high power, the electric energy stored for energizing the electric motor is saved when the engine outputs a high power. The electric motor is controlled to generate a sufficient assistive power when the engine is to be effectively assisted thereby as when the hybrid vehicle is running at a low speed.

The control system further comprises engine output correcting means for increasing an output power of the engine in synchronism with reducing the output power of the electric motor.

Since the engine output correcting means increases the output power of the engine in synchronism with reducing the output power of the electric motor, the drive power of the hybrid vehicle is prevented from varying, allowing the hybrid vehicle to maintain its drivability at a desired level.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 is a diagram showing a table for establishing demand drive powers;

FIG. 11 is a diagram showing a table for establishing running status quantities;

DETAILED DESCRIPTION OF THE PREFERRED EMBODIMENTS

Figure 1:
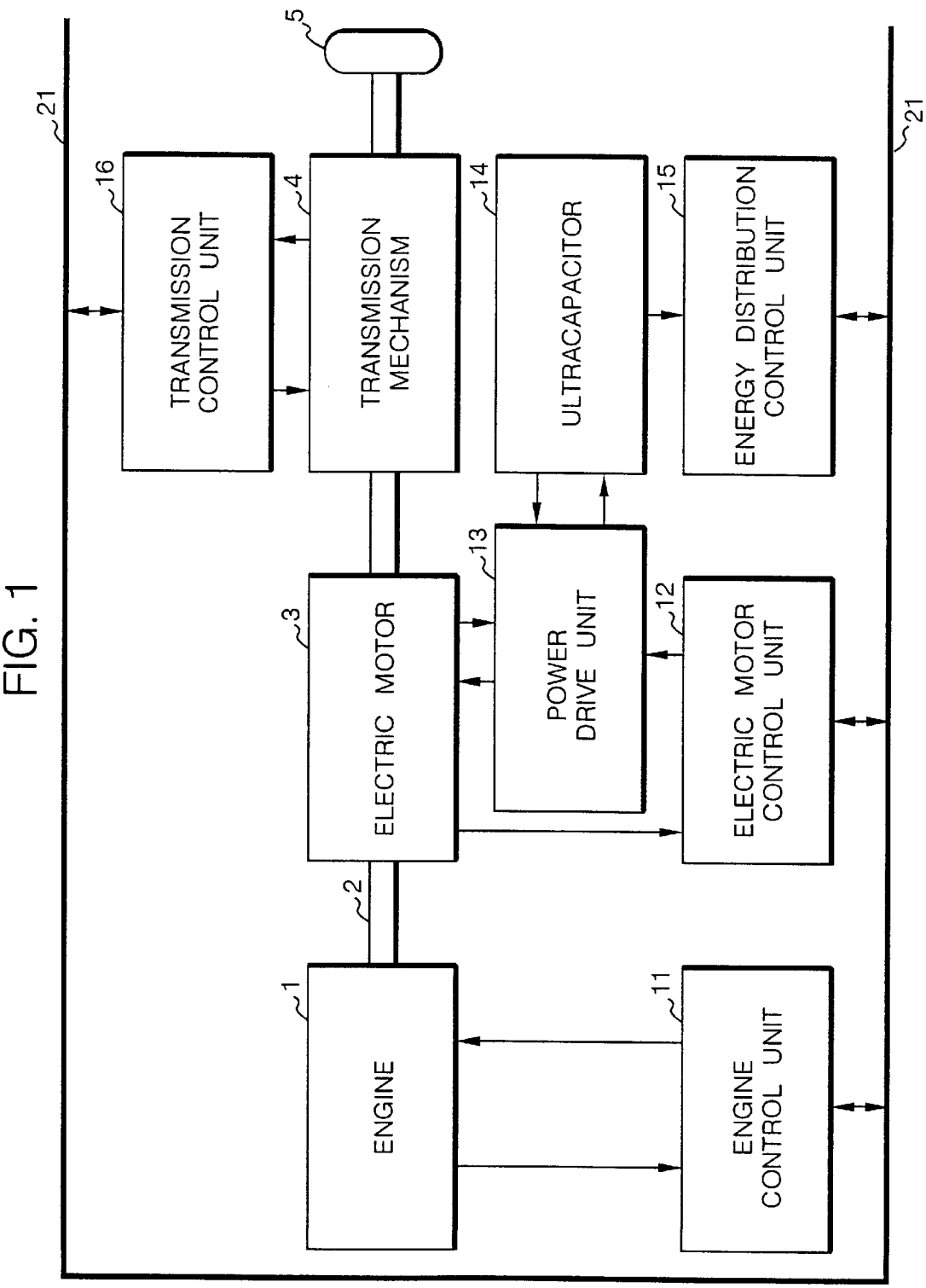
FIG. 1 is a block diagram of a drive apparatus of a hybrid vehicle and a control system therefor according to the present invention.

FIG. 1 shows in block form a drive apparatus of a hybrid vehicle and a control system therefor according to the present invention. Other components of the hybrid vehicle, including sensors, actuators, etc., are omitted from illustration in FIG. 1.

As shown in FIG. 1, the hybrid vehicle has an internal combustion engine 1 which rotates a drive axle 2 for rotating drive wheels 5 (only one shown) through a transmission mechanism 4. An electric motor 3 is connected to rotate the drive axle 2 directly. In addition to the ability to rotate the drive axle 2, the electric motor 3 has a regenerative ability to convert kinetic energy produced by the rotation of the drive axle 2 into electric energy. The electric motor 3 is connected to an ultracapacitor (an electric double-layer capacitor having a large electrostatic capacitance) 14 serving as an electric energy storage unit through a power drive unit 13 which includes a circuit for controlling the electric motor 3. The electric motor 3 is controlled by the power drive unit 13 to rotate the drive axle 2 and generate electric energy in a regenerative mode.

The control system also has an engine control unit 11 for controlling the engine 1, an electric motor control unit 12 for controlling the electric motor 3, an energy distribution control unit 15 for carrying out energy management based on a determined status of the ultracapacitor 14, and a transmission control unit 16 for controlling the transmission mechanism 4. The engine control unit 11, the electric motor control unit 12, the energy distribution control unit 15, and the transmission control unit 16 comprise respective ECUs (electronic control units) that are connected to each other through a data bus 21 for exchanging detected data, flags, and other information.

Figure 2:
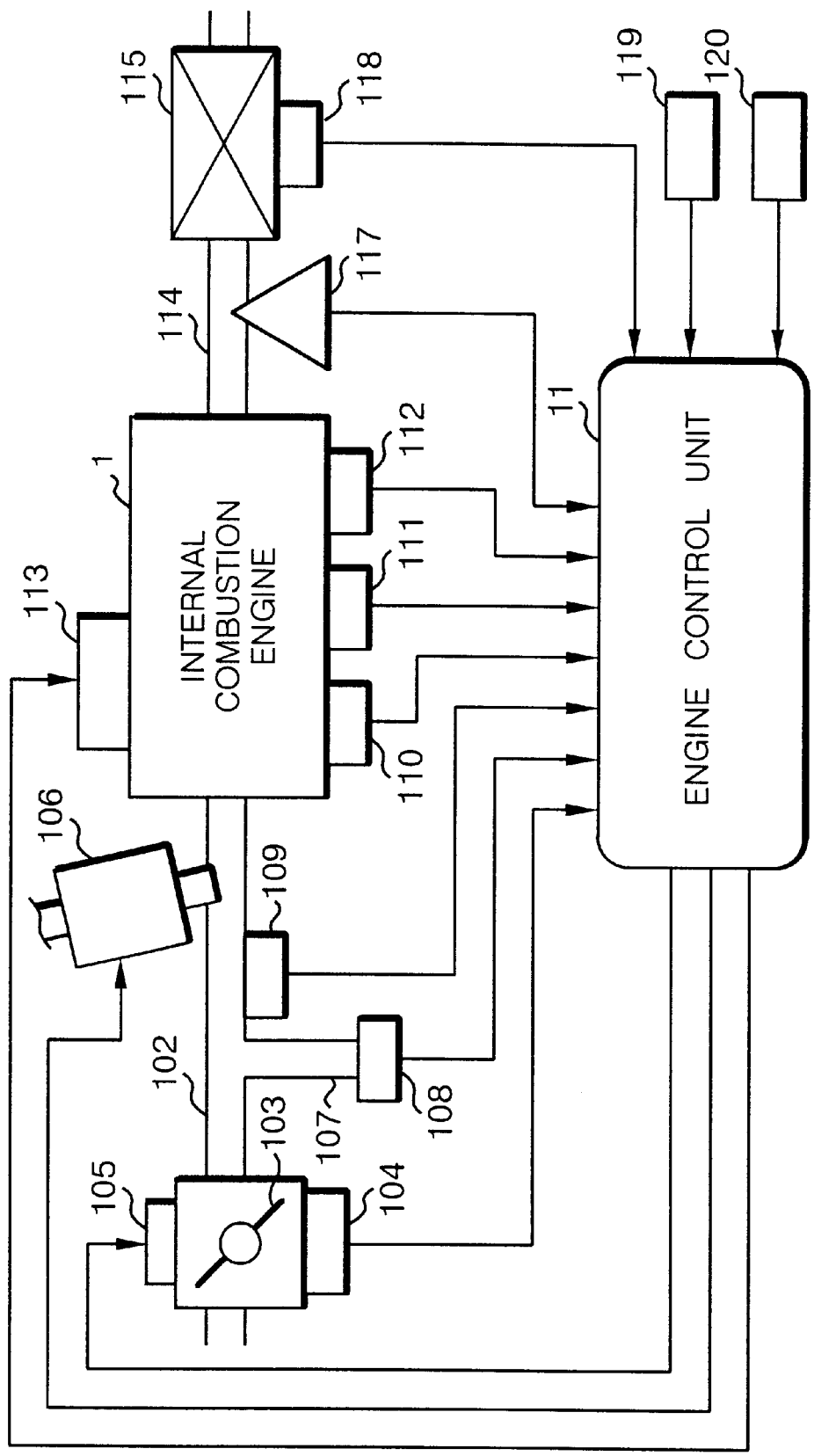
FIG. 2 is a block diagram of an engine control arrangement of the control system.

FIG. 2 shows the engine 1, the engine control unit 11, and ancillary devices thereof. A throttle valve 103 is mounted in an intake pipe 102 connected to the engine 1, and a throttle valve opening sensor 104 is coupled to the throttle valve 103 for generating an electric signal representative of the opening of the throttle valve 103 and supplying the generated electric signal to the engine control unit 11. A throttle actuator 105 for electrically controlling the opening of the throttle valve 103 is coupled to the throttle valve 103. The throttle actuator 105 is controlled for its operation by the engine control unit 11.

Fuel injection valves 106 are mounted in the intake pipe 102 at respective positions downstream of the throttle valve 103 and slightly upstream of respective intake valves (not shown) disposed respectively in the cylinders of the engine 1. The fuel injection valves 106 are connected through a pressure regulator (not shown) to a fuel tank (not shown). The fuel injection valves 106 are electrically connected to the engine control unit 11, which applies signals to the fuel injection valves 106 to control times to open and close the fuel injection valves 106.

An intake pipe absolute pressure (Pba) sensor 108 is connected to the intake pipe 102 through a pipe 107 immediately downstream of the throttle valve 103. The intake pipe absolute pressure sensor 108 generates an electric signal representative of an absolute pressure in the intake pipe 102, and supplies the generated signal to the engine control unit 11.

An intake temperature sensor 109 is mounted on the intake pipe 102 downstream of the intake pipe absolute pressure sensor 108. The intake temperature sensor 109 generates an electric signal representative of the temperature of intake air flowing in the intake pipe 102 and supplies the generated signal to the engine control unit 11.

An engine coolant temperature sensor 110, which may comprises a thermistor or the like, is mounted on the cylinder block of the engine 1. The engine coolant temperature sensor 110 generates an electric signal representative of the engine coolant temperature and supplies the generated signal to the engine control unit 11.

An engine rotational speed (NE) sensor 111 is mounted near a camshaft or crankshaft (not shown) of the engine 1. The engine rotational speed sensor 111 generates a signal pulse at a predetermined crankshaft angle (hereinafter referred to as a "TDC signal pulse") each time the crankshaft of the engine 1 makes a 180° turn, and supplies the TDC signal pulse to the engine control unit 11.

A sensor 112 is mounted on the internal combustion engine 1 for generating a pulse each time the crankshaft turns through a predetermined angle. A pulse signal generated by the sensor 112 is supplied to the engine control unit 11, which identifies an engine cylinder into which fuel is to be injected or in which the injected fuel is to be ignited, based on the supplied pulse signal.

The engine 1 has ignition plugs 113 positioned at the respective cylinders and electrically connected to the engine control unit 11, which controls the ignition timing of the ignition plugs 113.

A three-way catalytic converter 115 for purifying toxic components, including HC, CO, NOx, etc. of exhaust gases emitted from the engine 1 is mounted in an exhaust pipe 114 connected to the engine 1. An air-fuel ratio sensor 117 is mounted on the exhaust pipe 114 upstream of the three-way catalytic converter 115. The air-fuel ratio sensor 117 generates an electric signal substantially proportional to the concentration of oxygen in the exhaust gases, and supplies the generated signal to the engine control unit 11. The air-fuel ratio sensor 117 can detect the air-fuel ratio of an air-fuel mixture supplied to the engine 1 through a wide range of air-fuel ratios ranging from a theoretical air-fuel ratio to lean and rich values.

A catalyst temperature sensor 118 is mounted on the three-way catalytic converter 115 for detecting the temperature thereof. The catalyst temperature sensor 118 supplies an electric signal representative of the detected temperature to the engine control unit 11. A vehicle speed sensor 119 for detecting the speed Vcar of the hybrid vehicle and an accelerator opening sensor 120 for detecting the depression (hereinafter referred to as an "accelerator opening") of the accelerator pedal are electrically connected to the engine control unit 11. Electric signals generated by the vehicle speed sensor 119 and the accelerator opening sensor 120 are supplied to the engine control unit 11.

The engine control unit 11 comprises an input circuit for shaping the waveforms of input signals from the above various sensors, correcting the voltage levels thereof into predetermined levels, and converging analog signals into digital signals, a central processing unit (hereinafter referred to as a "CPU"), a memory for storing various processing programs to be executed by the CPU and various processed results, and an output circuit for supplying drive signals to the fuel injection valves 106 and the ignition plugs 113. The ECUs of the other control units including the electric motor control unit 12, the energy distribution control unit 15, and the transmission control unit 16 are structurally similar to the engine control unit 11.

Figure 3:
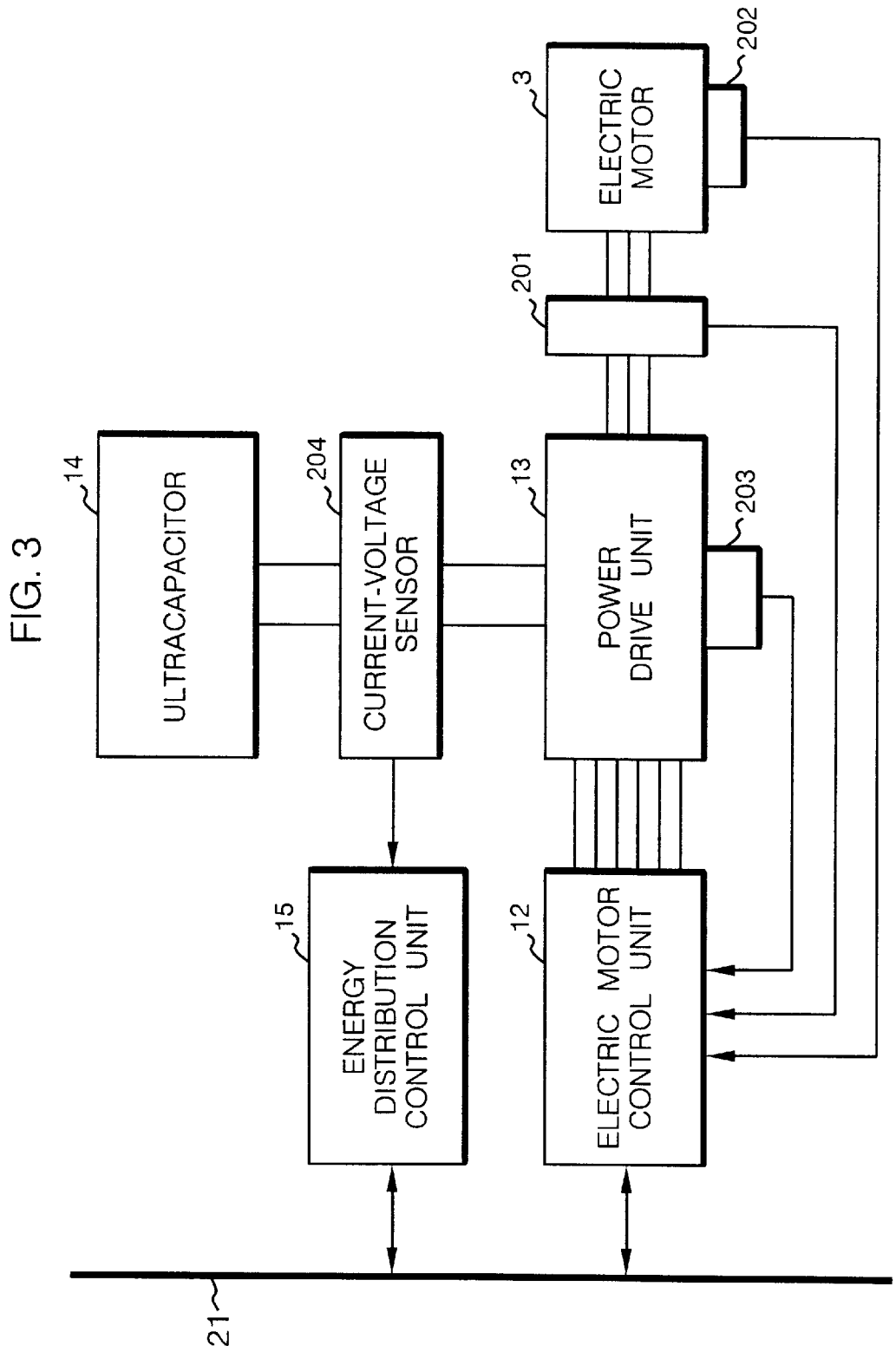
FIG. 3 is a block diagram of an electric motor control arrangement of the control system.

FIG. 3 shows a connected arrangement of the electric motor 3, the power drive unit 13, the ultracapacitor 14, the electric motor control unit 12, and the energy distribution control unit 15.

As shown in FIG. 3, the electric motor 3 is associated with an electric motor rotational speed sensor 202 for detecting the rotational speed of the electric motor 3. An electric signal generated by the electric motor rotational speed sensor 202 as representing the rotational speed of the electric motor 3 is supplied to the electric motor control unit 12. The power drive unit 13 and the electric motor 3 are interconnected by wires connected to a current-voltage sensor 201 which detects a voltage and a current supplied to or outputted from the electric motor 3. A temperature sensor 203 for detecting the temperature of the power drive unit 13, e.g., the temperature of a protective resistor of a drive circuit for the electric motor 3 or the temperature of an IGBT module (switching circuit), is mounted on the power drive unit 13. Detected signals from the sensors 201, 203 are supplied to the electric motor control unit 12.

The ultracapacitor 14 and the power drive unit 13 interconnected by wires connected to a current-voltage sensor 204 for detecting a voltage across the ultracapacitor 14 and a current outputted from or supplied to the ultracapacitor 14. A detected signal from the current-voltage sensor 204 is supplied to the energy distribution control unit 15.

Figure 4:
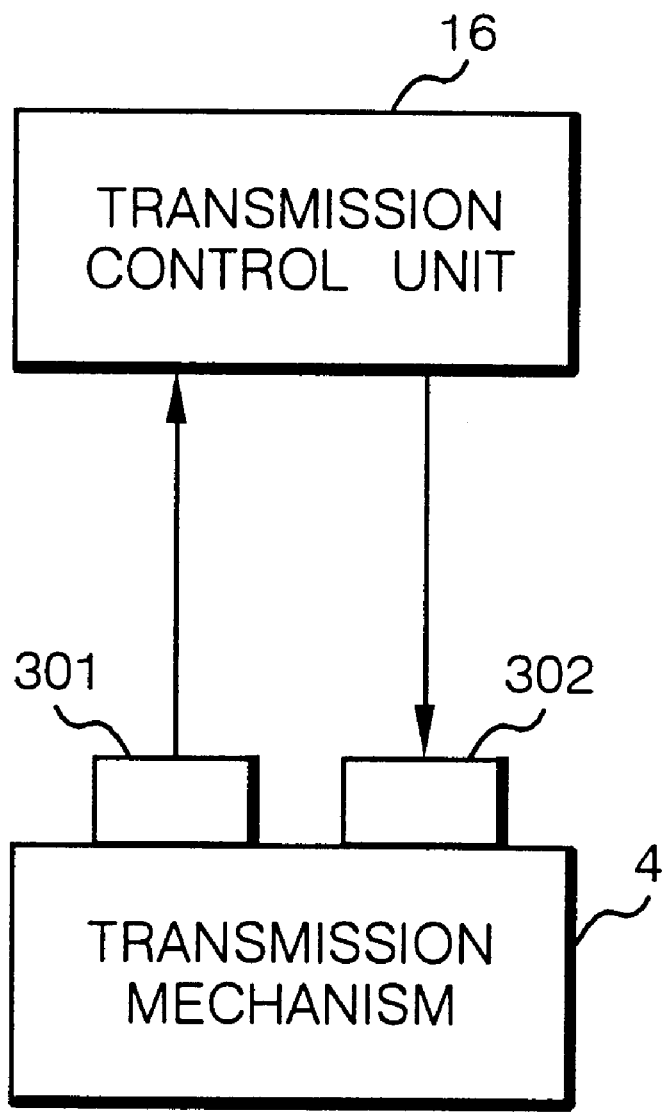
FIG. 4 is a block diagram of a transmission control arrangement of the control system.

FIG. 4 shows a connected arrangement of the transmission mechanism 4 and the transmission control unit 16. The transmission mechanism 4 is associated with a gear position sensor 301 for detecting a gear position of the transmission mechanism 4. A detected signal from the gear position sensor 301 is supplied to the transmission control unit 16. In the illustrated embodiment, the transmission mechanism 4 comprises an automatic transmission mechanism, and is also associated with a transmission actuator 302 which is controlled by the transmission control unit 16 to change gear positions of the transmission mechanism 4.

Figure 5:
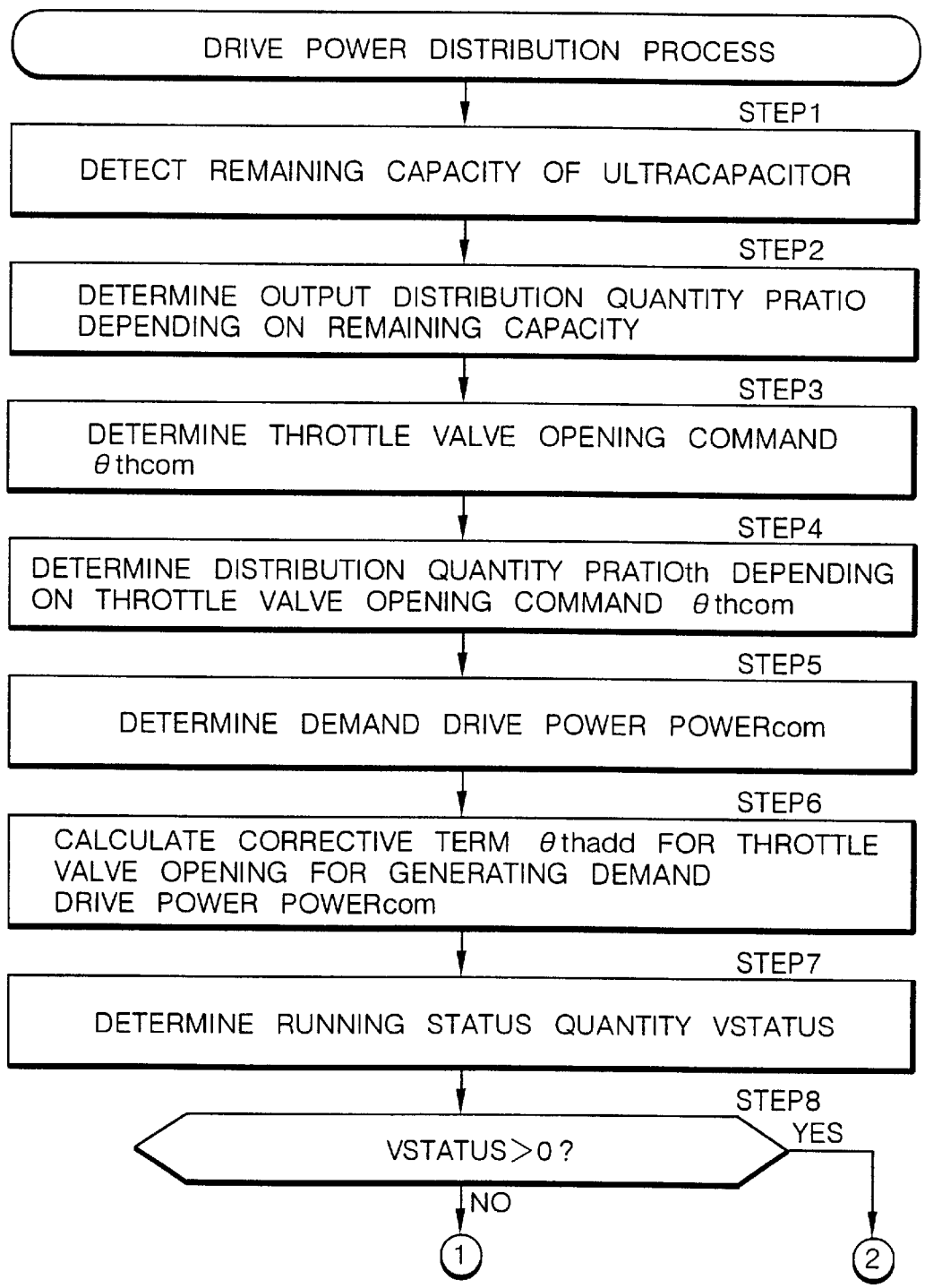
FIGS. 5 and 6 are a flowchart of a processing sequence for determining drive power distributions for an electric motor and an engine with respect to a demand drive power.
Figure 6:
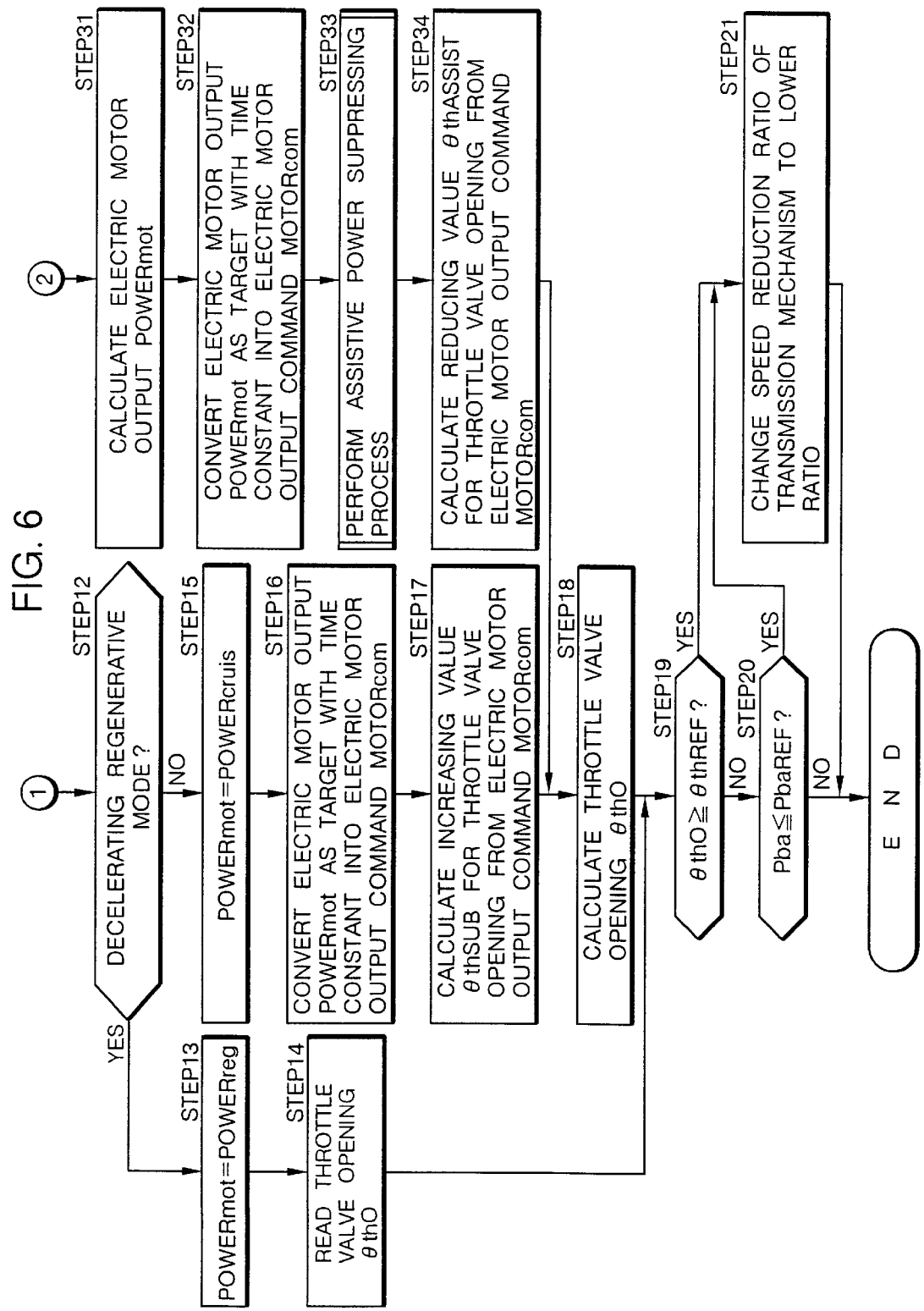

FIGS. 5 and 6 shows a processing sequence for determining output power distributions for the electric motor 3 and the engine 1 with respect to the demand drive power, i.e., how a drive power demanded for the hybrid vehicle when the driver operates a drive power control means is to be distributed to the electric motor 3 and the engine 1. The processing sequence shown in FIGS. 5 and 6 is executed by the electric motor control unit 12 in each periodic cycle (e.g., 1 msec.). However, the processing sequence shown in FIGS. 5 and 6 may be executed by the energy distribution control unit 15.

In FIG. 5, the electric motor control unit 12 detects a remaining capacity of the ultracapacitor 14 in STEP1. Specifically, the electric motor control unit 12 integrates an output current from the ultracapacitor 14 and a input current (charging current) to the ultracapacitor 14, which are detected by the current-voltage sensor 204, at each periodic interval, and calculates an integrated discharged value CAPAdis (positive value) and an integrated charged value CAPAchg (negative value). The electric motor control unit 12 then calculates a remaining capacity CAPArem of the ultracapacitor 14 according to the following equation (1):

$$CAPArem=CAPAful-(CAPAdis+CAPAchg) \quad (1)$$

where CAPAful represents a dischargeable quantity when the ultracapacitor 14 is fully charged.

The electric motor control unit 12 corrects the calculated remaining capacity CAPArem based on an internal resistance of the ultracapacitor 14 which varies with temperature, etc., thereby determining a final remaining capacity of the ultracapacitor 14. The proportion (%) of the corrected remaining capacity with respect to the dischargeable quantity CAPAful of the ultracapacitor 14 when it is fully charged is referred to as a remaining capacity ratio CAPAremC.

Instead of calculating the remaining capacity of the ultracapacitor 14 using the integrated discharged value CAPAdis and the integrated charged value CAPAchg, the remaining capacity of the ultracapacitor 14 may be estimated by detecting an open-circuit voltage across the ultracapacitor 14.

In STEP2, the electric motor control unit 12 determines an output power distribution quantity for the electric motor 3, i.e., a drive power to be generated by the electric motor 3, of a demand drive power POWERcom, using a table for establishing an output power distribution ratio. The drive power to the demand drive power, and will hereinafter be referred to as a "distribution ratio PRATIO".

Figure 7:
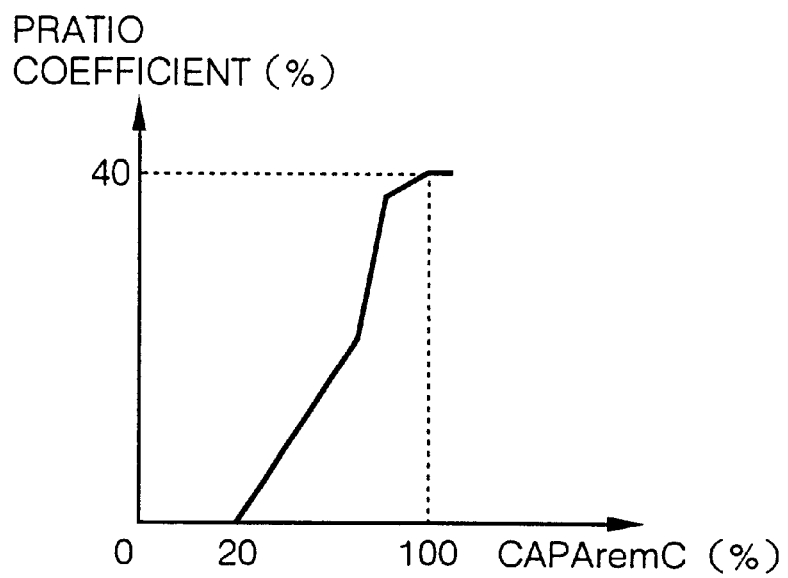
FIG. 7 is a diagram showing a table for establishing an output power distribution ratio.

FIG. 7 shows such a table for establishing an output power distribution ratio by way of example. The output power distribution ratio table is in the form of a graph having a horizontal axis which represents the remaining capacity CAPAremC of the ultracapacitor 14 and a vertical axis which represents the distribution ratio PRATIO. The output power distribution ratio table contains predetermined distribution ratios PRATIO with respect to remaining capacities, where the charging and discharging efficiency of the ultracapacitor 14 is maximum.

In STEP3, the electric motor control unit 12 searches a table for establishing an accelerator vs. throttle characteristic shown in FIG. 8 for a command (hereinafter referred to as a "throttle valve opening command") θthcom for the throttle actuator 105, which serves as an indication of the demand drive power, depending on an accelerator opening θap detected by the accelerator opening sensor 120.

Figure 8:
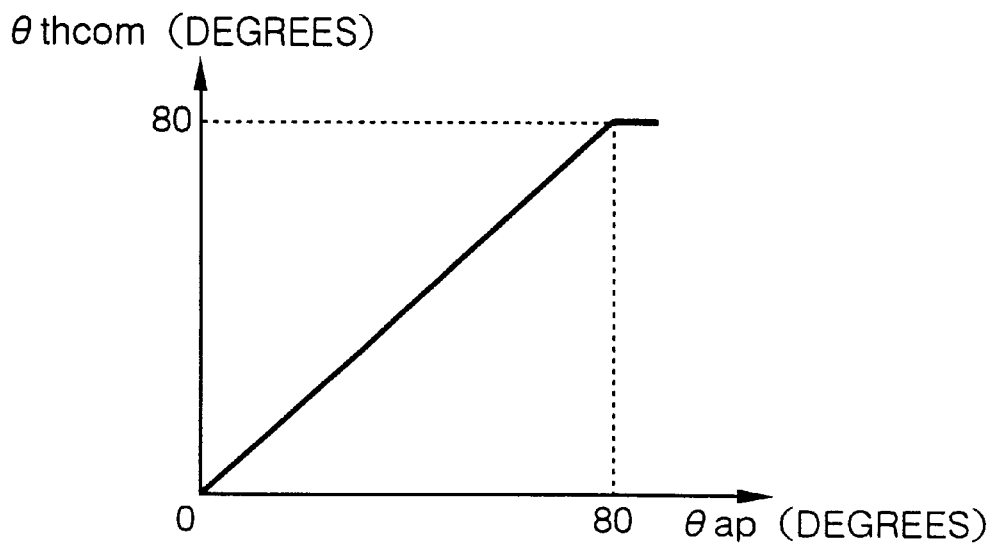
FIG. 8 is a diagram showing a table for establishing an accelerator vs. throttle characteristic.

In FIG. 8, values of the accelerator opening θap are equal to corresponding values of the throttle valve opening command θthcom. However, values of the accelerator opening θap may be different from corresponding values of the throttle valve opening command θthcom.

Figure 9:
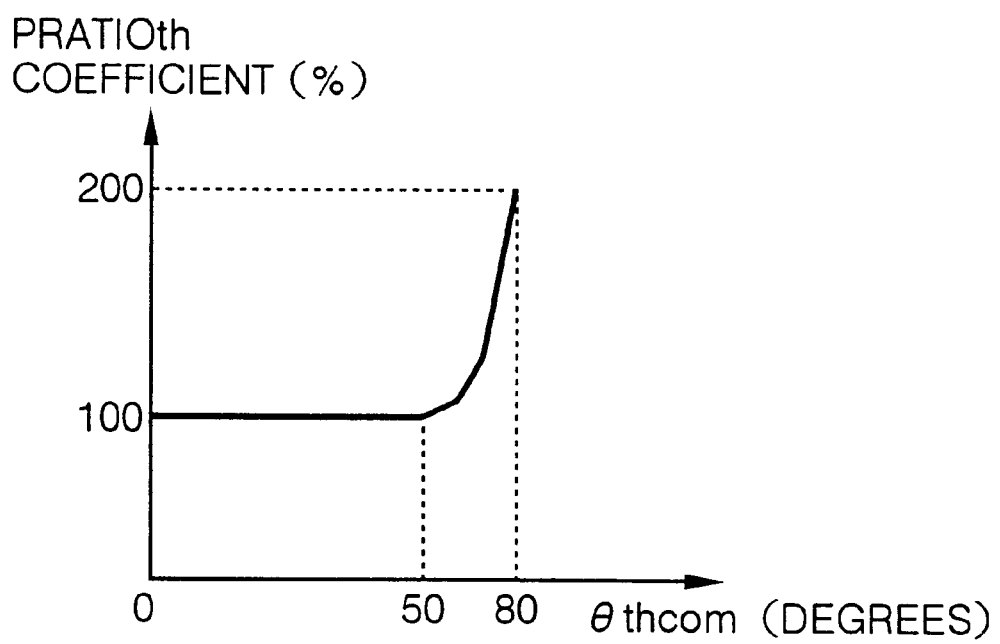
FIG. 9 is a diagram showing a table for establishing an electric motor output power distribution depending on a throttle valve opening.

In STEP4, the electric motor control unit 12 searches a table for establishing an electric motor output power distribution depending on a throttle valve opening shown in FIG. 9, for a distribution ratio PRATIOth for the electric motor 3 depending on the determined throttle valve opening command θthcom.

The table shown in FIG. 9 is established such that the output power, which is indicated by the distribution ratio PRATIOth, generated by the electric motor 3 is increased when the throttle valve opening command θthcom is 50 degrees or higher, for example.

While the distribution ratio PRATIOth is determined depending on the throttle valve opening command θthcom in the illustrated embodiment, the distribution ratio PRATIOth may be determined depending on one or more parameters proportional to the throttle valve opening.

In STEP5, the electric motor control unit 12 searches a demand drive power map shown in FIG. 10 for a demand drive power POWERcom depending on the throttle valve opening command θthcom and the engine rotational speed NE.

The demand drive power map shown in FIG. 10 is a map for determining a demand drive power POWERcom which the driver of the hybrid vehicle demands. The demand drive power map shown in FIG. 10 contains values of the demand drive power POWERcom depending on values of the throttle valve opening command θthcom (which may instead be the accelerator opening θap) and values of the engine rotational speed NE.

In STEP6, the electric motor control unit 12 calculates a corrective term θthadd for the throttle valve opening for generating the demand drive power POWERcom (θthcom=θthi+θthadd (θthi represents a previous throttle valve opening)). In STEP7, the electric motor control unit 12 searches a table for establishing running status quantities shown in FIG. 11, for a running status quantity VSTATUS depending on the vehicle speed Vcar detected by the vehicle speed sensor 119 and an extra output power POWERex of the engine 1.

The extra output power POWERex of the engine 1 is calculated according to the following equation (2):

$$POWERex=POWERcom-RUNRST \quad (2)$$

where RUNRST represents a running resistance to the hybrid vehicle. The running resistance RUNRST is determined from a RUNRST table (not shown) established depending on the vehicle speed Vcar. Each of the demand drive power POWERcom and the running resistance RUNRST is expressed in the unit of kW (kilowatts).

The running status quantity VSTATUS determined by the vehicle speed Vcar and the extra output power POWERex corresponds to an assistive distribution ratio of the electric motor 3 with respect to the extra output power POWERex, and may be set to integral values (%) ranging from 0 to 200. If the running status quantity VSTATUS is "0", then the hybrid vehicle is in a running status not to be assisted by the electric motor 3, i.e., the hybrid vehicle is decelerating or cruising. If the running status quantity VSTATUS is greater than "0", then the hybrid vehicle is in a running status to be assisted by the electric motor 3.

In STEP8, the electric motor control unit 12 decides whether the running status quantity VSTATUS is greater than "0"or not. If VSTATUS>0, i.e., if the hybrid vehicle is in a running status to be assisted by the electric motor 3, then the hybrid vehicle enters an assistive mode, and control goes from STEP8 to STEP31 shown in FIG. 6. If VSTATUS=0, i.e., if the hybrid vehicle is decelerating or cruising, then the hybrid vehicle enters a regenerative mode (i.e., a decelerating regenerative mode or a cruise charging mode), and control goes from STEP8 to STEP12 shown in FIG. 6.

In STEP31, the electric motor control unit 12 calculates an electric motor output power POWERmot according to the following equation (3):

$$POWERmot=POWERcom \times PRATIO \times PRATIOth \times VSTATUS \quad (3)$$

In STEP32, the electric motor control unit 12 converts the electric motor output power POWERmot as a target with a time constant into an electric motor output command MOTORcom.

Figure 12:
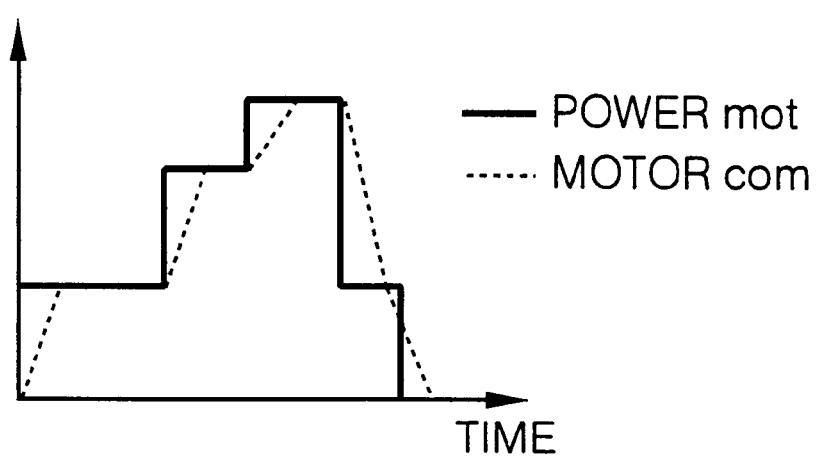
FIG. 12 is a diagram showing the relationship between an electric motor output power POWERmot and a converted electric motor output command MOTORcom.

FIG. 12 shows the relationship between the electric motor output power POWERmot and the converted electric motor output command MOTORcom. In FIG. 12, the solid-line curve illustrates the electric motor output power POWERmot as it changes with time, and the dotted-line curve illustrates the electric motor output command MOTORcom as it changes with time.

As can be seen from FIG. 12, the electric motor output command MOTORcom is controlled so as to gradually approach the electric motor output power POWERmot as a target with a time constant, i.e., with a time delay. If the electric motor output command MOTORcom were established such that the electric motor 3 would generate the electric motor output power POWERmot immediately in response to the electric motor output command MOTORcom, then since an increase in the output power of the engine 1 would be delayed, the engine 1 would not be readied to accept the electric motor output power POWERmot immediately, with the result that the drivability of the hybrid vehicle would be impaired. It is necessary, therefore, to control the electric motor 3 to generate the electric motor output power POWERmot after waiting until the engine 1 becomes ready to accept the electric motor output power POWERmot.

Figure 13:
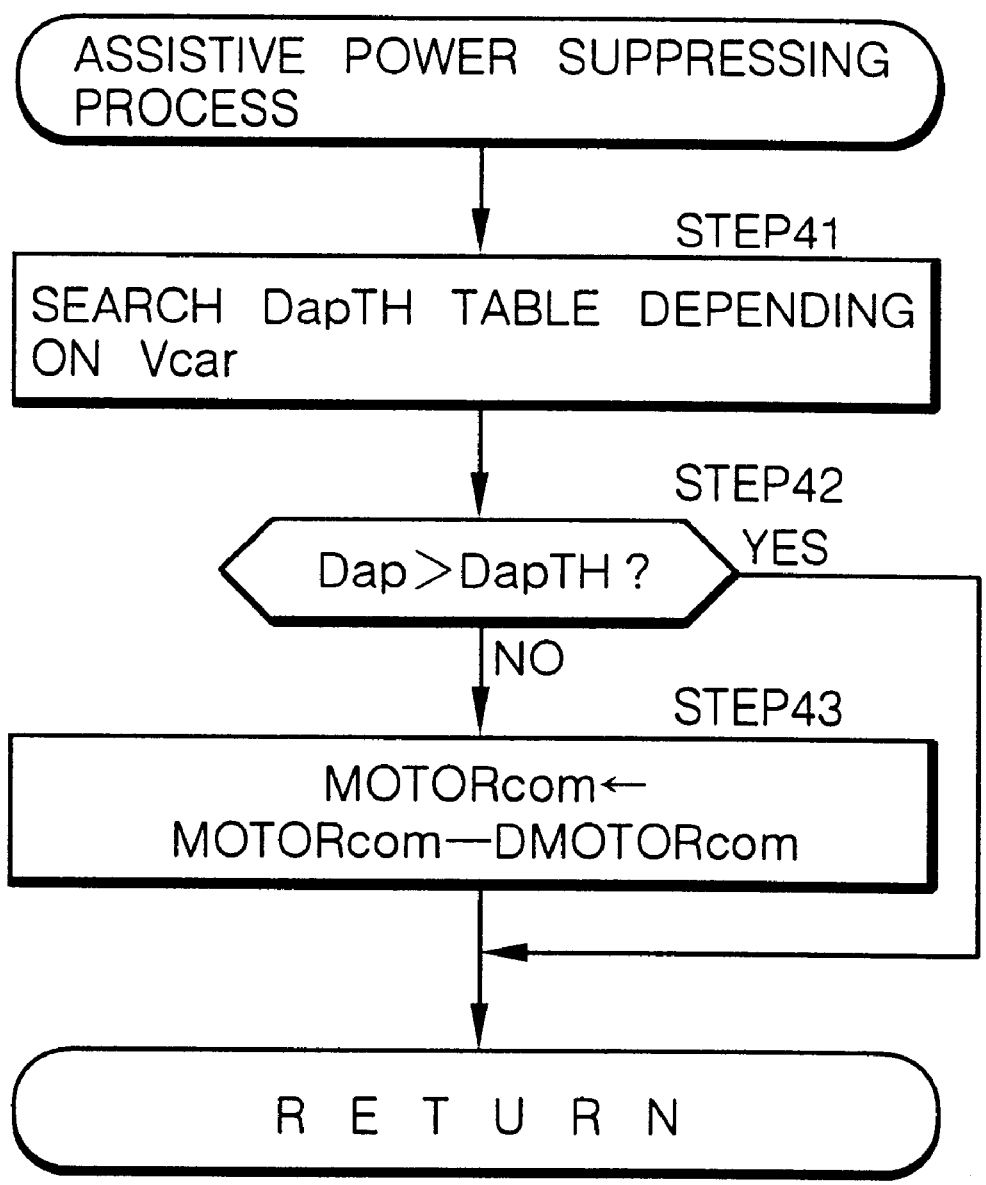
FIG. 13 is a flowchart of an assistive power suppressing process in the processing sequence shown in FIG. 6, according to a first embodiment of the present invention.

In STEP33, the electric motor control unit 12 executes an assistive power suppressing process, shown in FIG. 13, according to a first embodiment of the present invention. The assistive power suppressing process, shown in FIG. 13, according to the first embodiment of the present invention will be described below.

Figure 14:
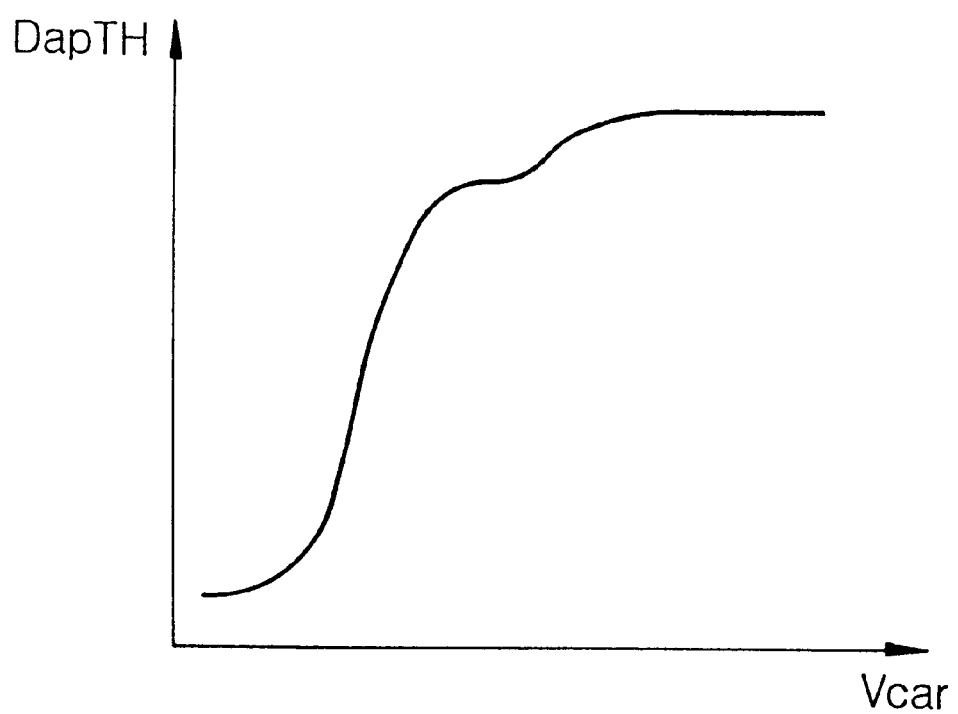
FIG. 14 is a diagram showing a table for establishing a reference value for a manipulated variable of a drive power control means used in the assistive power suppressing process shown in FIG. 13.

In STEP41 shown in FIG. 13, the electric motor control unit 12 searches a manipulated variable reference value DapTH table shown in FIG. 14 depending on the vehicle speed Vcar thereby to calculate a reference value DapTH for the manipulated variable of the drive power control means. The manipulated variable Dap of the drive power control means corresponds to a demand acceleration, and the manipulated variable reference value DapTH table shown in FIG. 14 is established such that as the vehicle speed Vcar increases, the reference value DapTH for the manipulated variable increases. Then, the electric motor control unit 12 decides whether the manipulated variable Dap for the accelerator opening θap (=θap (present value)−θapi (previous value)) is greater than the reference value DapTH or not in STEP42. If Dap>DapTH, then the electric motor control unit 12 finishes the assistive power suppressing process without correcting the electric motor output command MOTORcom. If Dap≦DapTH, then the electric motor control unit 12 reduces the electric motor output command MOTORcom by a subtractive corrective term DMOTORcom in STEP43, and then leaves the assistive power suppressing process. The subtractive corrective term DMOTORcom may be of a constant value, or may be variable depending on the manipulated variable Dap for the accelerator opening θap or the vehicle speed Vcar.

Thus, as the vehicle speed Var becomes higher, even though the manipulated variable Dap for the accelerator opening θap remains the same, the reference value DapTH for the manipulated variable increases, and STEP43 is executed to suppress the assistive power generated by the electric motor 3. As a result, the electric energy for energizing the electric motor 3 is prevented from being unduly wasted while the hybrid vehicle is being subject to a large running resistance, and is available to the electric motor 3 to generate a sufficient assistive power when the engine is to be effectively assisted thereby as when the hybrid vehicle is running at a low speed.

The manipulated variable reference value DapTH table may be established similarly to the curve shown in FIG. 14 depending on the engine rotational speed NE. In this case, the electric motor control unit 12 calculates the manipulated variable reference value DapTH depending on the engine rotational speed NE in STEP41 shown in FIG. 13. According to this modified process, the assistive power generated by the electric motor 3 while the counterelectro-motive force of the electric motor 3 is large is suppressed, thus saving the electric energy against undue consumption.

In STEP34, the electric motor control unit 12 calculates a corrective term (reducing value) θthASSIST for controlling a target value θthO for the throttle valve opening in a valve closing direction, depending on the electric motor output command MOTORcom. Thereafter, control goes from STEP34 to STEP18.

The corrective term θthASSIST serves to reduce the output power of the engine 1 by an amount commensurate with the increase in the output power of the electric motor 3 responsive to the electric motor output command MOTORcom. The corrective quantity θthASSIST is calculated for the following reasons:

When the target value θthO for the throttle valve opening is determined by the throttle valve opening command θthcom, which is an indication of the demand drive power, determined in STEP3 and the corrective term θthcom calculated in STEP6 based on the throttle valve opening command θthcom, and the throttle actuator 105 is controlled by the target value θthO, the demand drive power POWERcom is generated solely from the output power of the engine 1. Therefore, if the target value θthO were not corrected and the electric motor 3 were controlled by the electric motor output command MOTORcom converted in STEP10, the sum of the output power of the engine 1 and the output power of the electric motor 3 would exceed the demand drive power POWERcom, resulting in a drive power greater than the demand drive power demanded by the driver. To avoid this problem, the output power of the engine 1 is reduced by an amount commensurate with the output power of the electric motor 3, and the corrective quantity θthASSIST is calculated such that the sum of the output power of the engine 1 and the output power of the electric motor 3 will be equalized to the demand drive power POWERcom.

When the electric motor output command MOTORcom is reduced in STEP43 shown in FIG. 13, the corrective quantity θthASSIST is increased by an amount commensurate with the reduction in the output power of the electric motor 3, and the reduction in the output power of the electric motor 3 is compensated for the output power of the engine 1. Therefore, the hybrid vehicle maintains its drivability at a desired level.

In STEP12, the electric motor control unit 12 decides whether the present regenerative mode is the decelerating regenerative mode or the cruise charging mode. Specifically, the electric motor control unit 12 makes such a mode decision based on the extra output power POWERex, i.e., decides whether POWERex<0 or not (or smaller than a given negative value near 0 or not). Alternatively, the electric motor control unit 12 may decide whether the manipulated variable Dap for the accelerator opening θap is smaller than a predetermined negative quantity DapD. According to this alternative, if Dap<DapD, then the electric motor control unit 12 determines that present regenerative mode is the decelerating regenerative mode, and if Dap≦DapD, then the electric motor control unit 12 determines that present regenerative mode is the cruise charging mode.

If the extra output power POWERex is smaller than 0 (or smaller than a given negative value near 0) in STEP12, then the electric motor control unit 12 judges the present regenerative mode as the decelerating regenerative mode, and sets the electric motor output power POWERmot to a decelerating regenerative output power POWERreg in STEP13. The decelerating regenerative output power POWERreg is calculated according to a decelerating regenerative processing routine (not shown).

In STEP14, the electric motor control unit 12 reads an optimum target value θthO for the throttle valve opening in the decelerating regenerative mode, i.e., an optimum target value θthO for the throttle valve opening calculated in the decelerating regenerative processing routine. Thereafter, control proceeds to STEP19.

If the extra output power POWERex is of a value near 0 (the running status quantity VSTATUS is 0 because of "NO" to STEP8) in STEP12, then the electric motor control unit 12 judges the present regenerative mode as the cruise charging mode, and sets the electric motor output power POWERmot to a cruise charging output power POWERcruis in STEP15. The cruise charging output power POWERcruis is calculated according to a cruise charging processing routine (not shown).

In STEP16, the electric motor control unit 12 converts the electric motor output power POWERmot as a target with a time constant into an electric motor output command MOTORcom. In STEP17, the electric motor control unit 12 calculates a corrective term (increasing value) θthSUB for controlling a target value θthO for the throttle valve opening in a valve opening direction, depending on the electric motor output command MOTORcom. Thereafter, control goes from STEP17 to STEP18.

The corrective quantity θthSUB is calculated for the reasons that are opposite to the reasons for which the corrective term θthASSIST is calculated as described above.

The electric motor output power POWERmot in the cruise charging mode has a sign opposite to the sign of the electric motor output power POWERmot in the assistive mode. Specifically, in the cruise charging mode, the electric motor 3 is controlled in a direction to reduce the demand drive power POWERcom because of the electric motor output command MOTORcom in the cruise charging mode. In order to maintain the demand drive power POWERcom in the cruise charging mode, it is necessary to make up for the output power of the electric motor 3 reduced by the electric motor output command MOTORcom, with the output power of the engine 1.

In STEP18, the electric motor control unit 12 calculates the target value θthO for the throttle valve 103 according to the following equation (4):

$$\theta thO = \theta thi + \theta thadd - \theta thSUB \qquad (4)$$

In STEP19, the electric motor control unit 12 decides whether or not the calculated target value θthO is equal to or greater than a predetermined reference value θthREF. If θthO<θthREF, the electric motor control unit 12 decides whether or not an intake pipe absolute pressure Pba is equal to or smaller than a predetermined reference value PbaREF in STEP20.

If Pba>PbaREF, then the processing sequence shown in FIGS. 5 and 6 is finished. If θthO≧θthREF in STEP19 or if Pba≦PbaREF in STEP20, then the electric motor control unit 12 changes the speed reduction ratio of the transmission mechanism 4 to a lower speed reduction ratio in STEP21. Thereafter, the processing sequence shown in FIGS. 5 and 6 is finished.

When control goes to STEP21, the remaining capacity of the ultracapacitor 14 is reduced thereby to reduce the electric motor output power POWERmot, and the reduction in the electric motor output power POWERmot needs to be made up for by the engine 1, but the output power of the engine 1 cannot be increased anymore. At this time, the speed reduction ratio of the transmission mechanism 4 is changed to a lower speed reduction ratio to keep the torque produced by the drive axle 2 at a constant level, i.e., the same torque as before STEP21, to keep desired drivability of the hybrid vehicle. The speed reduction ratio of the transmission mechanism 4 is actually changed by the transmission control unit 16 under the control of the electric motor control unit 12.

An engine control process carried out by the engine control unit 11 will be described below.

Figure 15:
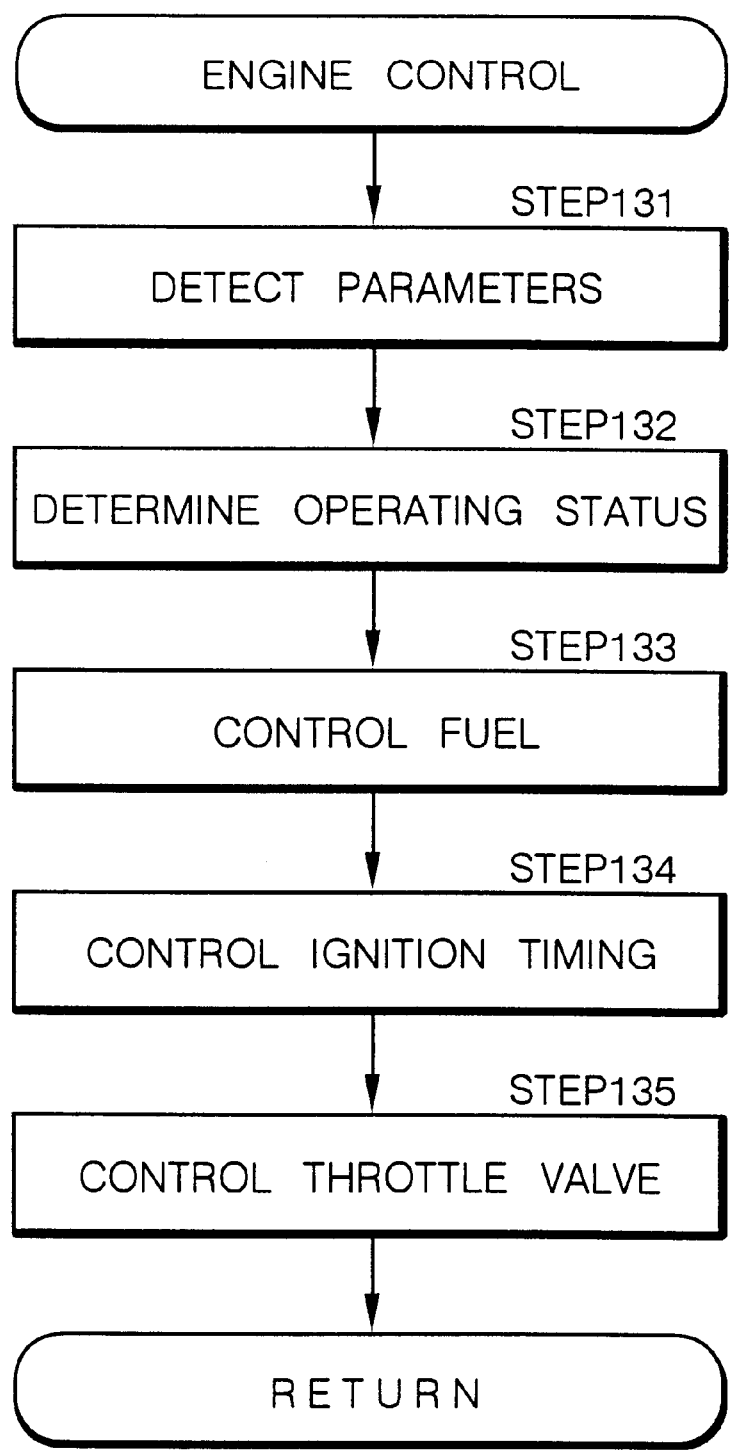
FIG. 15 is a flowchart of an overall engine control processing sequence.

FIG. 15 shows an overall engine control processing sequence, which is executed by the engine control unit 11 in each periodic cycle.

In FIG. 15, the engine control unit 11 detects various engine operating parameters including the engine rotational speed NE, the intake pipe absolute pressure Pba. etc. in STEP131. Then, the engine control unit 11 determines an engine operating status in STEP132, controls fuel to be supplied to the engine 1 in STEP133, controls ignition timing of the engine 1 in STEP134, and controls the throttle valve 103 in STEP135.

Specifically, the engine control unit 11 calculates an amount of fuel to be supplied to the engine 1 and controls ignition timing depending on the engine rotational speed NE, the intake pipe absolute pressure Pba, etc. in STEPs 133, 134, and controls the throttle actuator 105 to equalize the actual throttle valve opening θth to the target value θthO for the throttle valve opening calculated in STEP18 shown in FIG. 6 in STEP135.

In the above embodiment, STEPs 31–33 shown in FIG. 6 correspond to the function of a drive assistance control means, the accelerator opening θap or the throttle valve opening θthcom corresponds to the manipulated variable from the drive power control means, and a means for performing STEPs 34, 18 shown in FIG. 6 and STEP135 shown in FIG. 15 corresponds to an engine output correcting means.

An assistive power suppressing process shown in FIG. 16 according to a second embodiment of the present invention will be described below.

Figure 16:
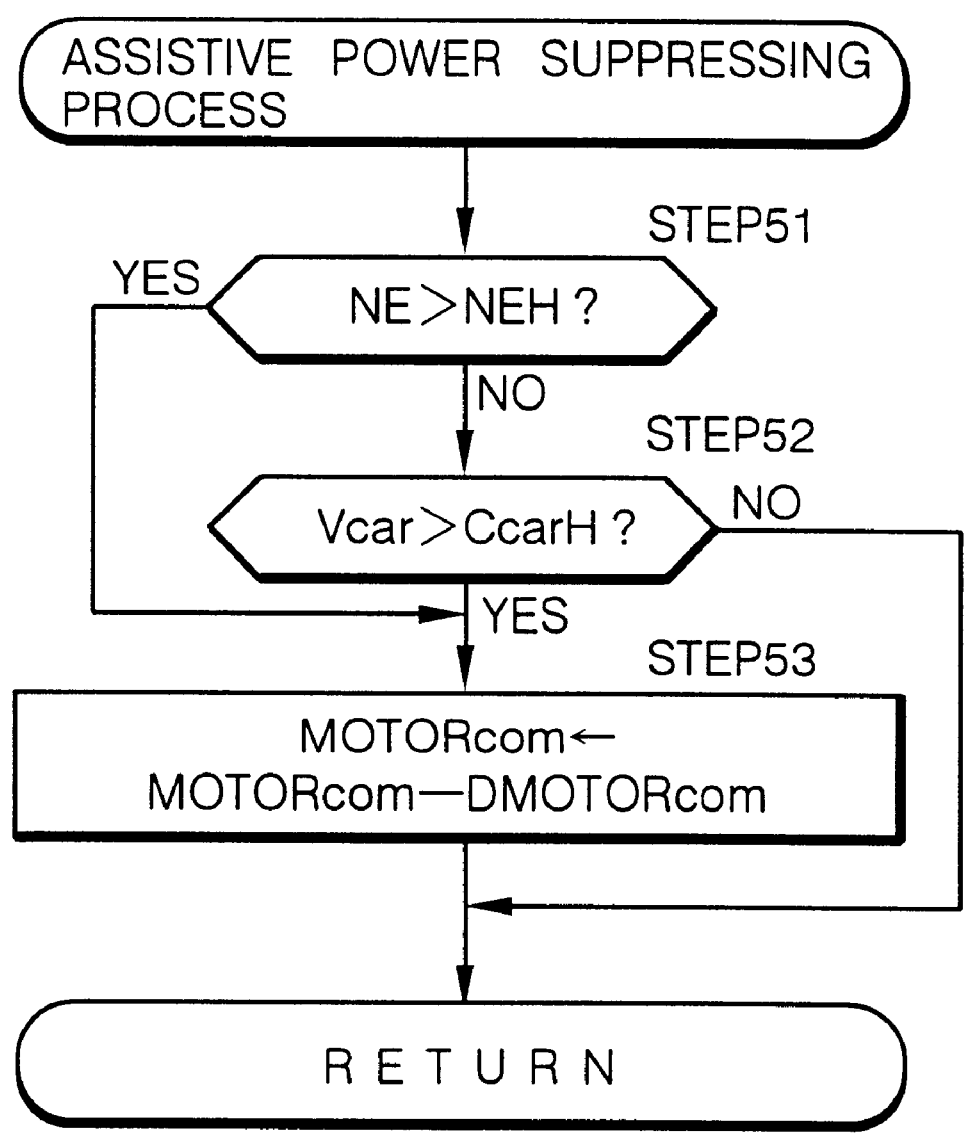
FIG. 16 is a flowchart of an assistive power suppressing process in the processing sequence shown in FIG. 6, according to a second embodiment of the present invention.

In STEP51 shown in FIG. 16, the electric motor control unit 12 decides whether the engine rotational speed NE is higher than a predetermined rotational speed NEH (e.g., 2500 rpm) or not. Then, the electric motor control unit 12 decides whether the vehicle speed Vcar is higher than a predetermined vehicle speed VcaH (e.g., 80 km/h) or not in STEP52. If NE>NEH or Vcar>VcarH, then the electric motor control unit 12 reduces the electric motor output command MOTORcom by a subtractive corrective term DMOTORcom in STEP53 as in STEP43 shown in FIG. 13, and then leaves the assistive power suppressing process. If NE≦NEH and Vcar≦VcarH, then the electric motor control unit 12 finishes the assistive power suppressing process without correcting the electric motor output command MOTORcom.

The vehicle speed Vcar, the electric motor output command MOTORcom, the engine output power, and the engine rotational speed NE as they vary with time in the assistive power suppressing process shown in FIG. 16 are shown respectively in FIGS. 17(a), 17(b), 17(c), and 17(d).

Figure 17:
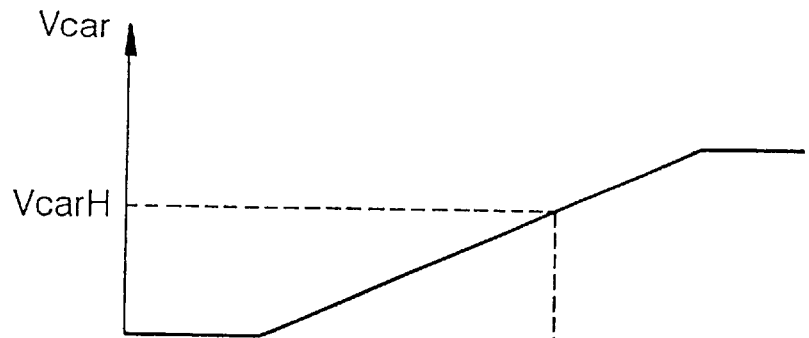
FIGS. 17(*a*) through 17(*d*) are timing charts illustrative of the assistive power suppressing process shown in FIG. 16.
Figure 17:
Figure 17:
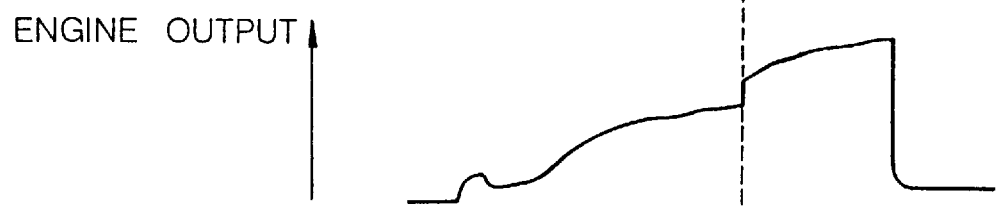
Figure 17:
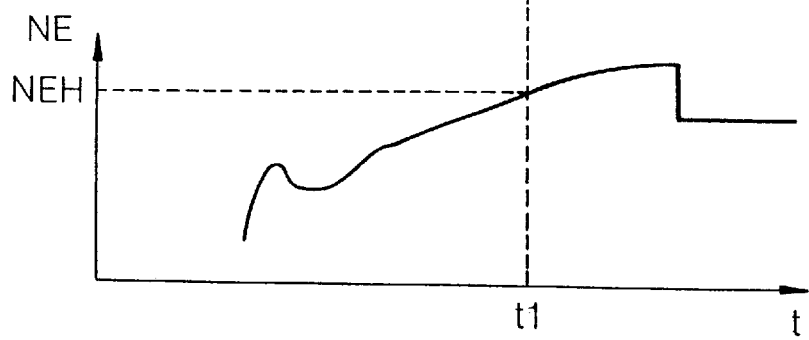

At a time t1 when the vehicle speed Vcar exceeds a predetermined vehicle speed VcarH as shown in FIG. 17(a), the electric motor output command MOTORcom is reduced by the subtractive corrective term DMOTORcom, as shown in FIG. 17(b). Thus, the assistive drive power generated by the electric motor 3 while the hybrid vehicle is running at a high speed is suppressed, preventing the electric energy from being unduly wasted. In STEP34 shown in FIG. 6, the output power of the engine 1 is increased by an additive corrective value commensurate with the reduction in the assistive drive power generated by the electric motor 3, thereby keeping the drivability of the hybrid vehicle at a desired level. The assistive drive power generated by the electric motor 3 is also suppressed at the time t1 when the engine rotational speed NE reaches the predetermined rotational speed NEH.

While the ultracapacitor is employed as the electric energy storage unit in the illustrated embodiments, the electric energy storage unit may instead comprise a battery.

In STEP43 shown in FIG. 13 or STEP53 shown in FIG. 16, the electric motor output command MOTORcom is reduced. However, the electric motor output command MOTORcom may be set to "0" so as not to assist the engine 1.

The throttle valve 103 whose opening is controlled by the electrically operated throttle actuator 105 may be replaced with an ordinary throttle valve that is mechanically linked to the accelerator pedal. In such a modification, the amount of intake air depending on the output power of the electric motor may be controlled by a passage bypassing the throttle valve and a control valve disposed in the passage. On an engine having a solenoid-operated intake valve which can electromagnetically operated, rather than by a cam mechanism, the amount of intake air depending on the output power of the electric motor may be controlled by changing the valve opening period of the solenoid-operated intake valve.

The transmission mechanism 4 may comprise a continuously variable transmission mechanism whose speed reduction ratio can be continuously varied. With such a continuously variable transmission mechanism, the speed reduction ratio can be determined from the ratio of the rotational speed of the drive shaft of the continuously variable transmission mechanism to the rotational speed of the driven shaft thereof, rather than by detecting the gear position.

According to the present invention, as described above, while the hybrid vehicle is normally running, the electric motor is controlled to generate an assistive power depending on the manipulated variable from the drive power control means. When the engine on the hybrid vehicle operates in a high rotational speed range or the hybrid vehicle runs in a high speed range with the electric motor being not required to effectively assist the engine, the output power from the electric motor is reduced to thereby save electric energy stored for energizing the electric motor. Conversely, when the hybrid vehicle is running at a low speed, the electric motor generates a sufficient assistive power that is needed to effectively assist the engine.

Although certain preferred embodiments of the present invention have been shown and described in detail, it should be understood that various changes and modifications may be made therein without departing from the scope of the appended claims.

What is claimed is:

1. A control system for controlling a hybrid vehicle having an engine for rotating a drive axel, an electric motor for assisting the engine in rotating the drive axel, and electric energy storage means for supplying electric energy to the electric motor, comprising:

drive power controlling means for controlling a drive power of the engine;

means for establishing a demand drive power of the hybrid vehicle based on a manipulated variable of the drive power controlling means and a rotational speed of the engine;

drive assistance control means for calculating an assisting output of the electric motor depending on a remaining capacity of the electric energy storage means and the demand drive power, and for calculating an output of the engine based on the calculated assisting output power of the electric motor and the demand drive power;

said drive assistance control means including control means for controlling the electric motor based on the calculated assisting output thereof, and correcting means for correcting the output of the engine based on the calculated output power thereof; and detecting means for detecting a rotational speed of the engine or a speed of the hybrid vehicle;

said drive assistance control means comprising means for subtracting a predetermined value from the calculated assisting output power of the electric motor when the detected rotational speed of the engine or the detected speed of the hybrid vehicle exceeds a predetermined reference value.

2. A control system according to claim 1, wherein said subtracted predetermined value in the assisting output power of the electric motor is variable depending on the manipulated variable of the drive power controlling means.

3. A control system according to claim 1, wherein, said engine output correcting means increases an output of the engine in synchronism with reducing the assisting output of the electric motor.

4. A control system according to claim 3, wherein said control means for controlling the electric motor controls the electric motor to gradually approach the calculated assisting output power with a predetermined time delay.

5. A control system according to claim 1, wherein said electric energy storage means comprises an electric double-layer capacitor.

6. A control system for controlling a hybrid vehicle having an engine for rotating a drive axle, an electric motor for assisting the engine in rotating the drive axle, electric energy storage means for supplying electric energy to the electric motor, and drive control means for drive power of the engine, comprising:

means for establishing a demand drive power based on a manipulated variable of the drive control means and a rotational speed of the engine;

drive assistance control means for calculating an assisting output of the electric storage means and the demand drive power, and for calculating an output power of the engine based on the calculated assisting output of the motor and the demand drive power;

said drive assistance control means including control means for controlling the electric motor based on the calculated assisting output thereof and a correcting means for correcting the output of the engine based on the calculated output power thereof; and manipulated variable detecting means for detecting a manipulated variable of the drive power control means;

said drive assistance control means comprising means for subtracting a predetermined value from said calculated assisting output of the electric motor when a manipulated variable of the drive control means is smaller than a predetermined reference value.

7. A control system according to claim 6, wherein said subtracted predetermined value in the assisting output of the electric motor is variable so as to increase as a rotational speed of the engine or a vehicle speed increases.

8. A control system according to claim 6, wherein said predetermined reference value is established so as to increase as a rotational speed of the engine or a speed of the hybrid vehicle increases.

9. A control system according to claim 6, wherein said engine output correcting means increases an output of the engine in synchronism with reducing the assisting output of the electric motor.

10. A control system according to claim 6, wherein said control means for controlling the electric motor controls the electric motor to gradually approach the calculated assisting output with a predetermined time delay.

11. A control system according to claim 6, wherein said electric energy storage means comprises an electric double-layer capacitor.

* * * * *